United States Patent [19]
Skudelny et al.

[11] Patent Number: 4,490,492
[45] Date of Patent: Dec. 25, 1984

[54] FLOWABLE MIXTURE AND USE OF SYNTHETIC CALCIUM SILICATE

[75] Inventors: Dieter Skudelny, Frechen; Gerhard Rauth, Cologne, both of Fed. Rep. of Germany

[73] Assignee: Ciba-Geigy AG, Basel, Switzerland

[21] Appl. No.: 424,677

[22] Filed: Sep. 27, 1982

Related U.S. Application Data

[63] Continuation of Ser. No. 237,203, Feb. 23, 1981, abandoned.

[30] Foreign Application Priority Data

Feb. 21, 1980 [DE] Fed. Rep. of Germany ....... 3006440

[51] Int. Cl.$^3$ ..................... C08L 63/02; C08L 67/06; C08L 61/06
[52] U.S. Cl. .................................... 523/443; 252/309; 252/315.01; 252/315.6; 252/315.7; 523/513; 524/779; 524/780; 524/783; 524/785; 524/787; 524/788; 524/789; 524/791

[58] Field of Search ............... 524/791, 442, 456, 779, 524/780, 781, 782, 783, 784, 785, 787, 788, 789; 523/401, 443, 216, 501, 513, 521; 252/309, 315.01, 315.6, 315.7

[56] References Cited

U.S. PATENT DOCUMENTS 4,251,576 2/1981 Osborn et al. ...................... 524/791
4,287,115 9/1981 Legler ............................. 260/37 EP

OTHER PUBLICATIONS

Chem. Abst. 87, 6934a, (1977).

*Primary Examiner*—Theodore E. Pertilla
*Attorney, Agent, or Firm*—Luther A. R. Hall

[57] ABSTRACT

Crystalline, synthetic calcium silicate, which can be in diverse stages of hydration and has a high length/width ratio and a width dimension of less than 1 μm, is outstandingly suitable as a sedimentation inhibitor for finely divided fillers in liquid substances.

9 Claims, No Drawings

FLOWABLE MIXTURE AND USE OF SYNTHETIC CALCIUM SILICATE

This is a continuation of application Ser. No. 237,203, filed on Feb. 23, 1981, now abandoned.

The invention relates to filled flowable mixtures and the use of synthetic, crystalline calcium silicate.

Quartz powders are known as a filler in epoxide and polyester casting resins, as a filler in compression moulding compositions and sealing compositions and also in spreadable and castable coatings based on epoxide, polyester and polyurethane resins. Hitherto, it was customary to admix the quartz powders to the plastics batches prior to processing. However, because of the danger of silicosis, the safety conditions imposed by the factory inspectorates in connection with the processing of quartz powders have, in the meantime, become so stringent that smaller manufacturers of plastic articles can no longer meet them and remain economically competitive.

The manufacturers of plastics are therefore adopting the practice of supplying the plastics batches already provided with filler, in order to relieve the processors of the problem of handling fillers. This applies in particular in the case of epoxide resin batches provided with quartz powder.

A problem which arises here, however, is that when the batches stand for a prolonged period the fillers sediment out and form a virtually hard sediment in the containers, which can practically no longer be dissolved and can no longer be dispersed uniformly in the plastic composition with an expenditure which is justifiable.

However, corresponding problems arise not only in the case of mixtures based on flowable plastics, but also in the case of inorganic suspensions, for example in the case of calcite suspended in waterglass.

It is already known to add so-called sedimentation inhibitors in such cases, i.e. substances which slow down or prevent settling out of the suspended substances and, at the same time, do not substantially increase the viscosity of the mixture which becomes evident on mechanical processing.

Some of the sedimentation inhibitors of this type are of a purely chemical nature and are added in liquid form to the mixture, as is the case, for example, with the betaines disclosed for such a purpose in German Patent Specification No. 2,546,810.

However, sedimentation inhibitors in solid form have also already been disclosed which are also essentially inert towards the flowable carrier of the suspension. Thus, for example, asbestos, which has a fine-fibred crystalline structure and exerts its sedimentation-inhibiting action in the main by mechanical means, is used for such purposes.

However, asbestos is a material which has a harmful effect on health, which effect has been discussed particularly vigorously recently; the tendency with this material is to replace it in all fields and types of application by other substances.

Thus, the object on which the invention is based is to indicate an asbestos-free sedimentation inhibitor.

The present invention relates to a flowable mixture of a liquid polymerisable synthetic resin, or of a liquid reactant of a synthetic resin, with a filler suspended therein and a sedimentation inhibitor, which mixture contains, as the sedimentation inhibitor, a crystalline synthetic calcium silicate, which can be in diverse stages of hydration and has a high length/width ratio and width dimensions of less than 1 $\mu$m.

Suitable liquid synthetic resins are, for example, those which under the action of light, heat and/or catalysts can be polymerised during processing to give thermosetting end products. The resins are essentially self-crosslinkable synthetic resins, which can also be prepolymers or preadducts.

Examples of self-crosslinkable synthetic resins are: phenoplasts which are obtained from aldehydes and phenols; which can be alkylated phenols and are prepared in a basic medium, aminoplasts, for example urea-formaldehyde resins or melamine-formaldehyde resins, alkyd resins and oil-modified alkyd resins, unsaturated polyesters, especially based on maleic acid, epoxide resins, especially based on bisphenol A, polyurethanes, unsaturated polyimides, especially based on bis-maleimides which can be C-alkylated, and silicones.

Suitable epoxide resins are in particular those which have, on average, more than one glycidyl group, $\beta$-methylglycidyl group or 2,3-epoxycyclopentyl group bonded to a hetero-atom (for example sulfur and preferably oxygen or nitrogen); preferred epoxide resins are bis-(2,3-epoxycyclopentyl) ether; di- and poly-glycidyl ethers of poly hydric aliphatic alcohols, such as 1,4-butanediol, or polyalkylene glycols, such as polypropylene glycol; di- or poly-glycidyl ethers of cycloaliphatic polyols, such as 2,2-bis-(4-hydroxycyclohexyl)-propane; di- and poly-glycidyl ethers of polyhydric phenols, such as resorcinol, bis(p-hydroxyphenyl)-methane, 2,2-bis-(p-hydroxyphenyl)-propane (=diomethane), 2,2-bis-(4'-hydroxy-3',5'-dibromophenyl)-propane or 1,1,2,2-tetrakis-(p-hydroxyphenyl)-ethane, or of condensation products of phenols with formaldehyde which are obtained under acid conditions, such as phenol novolacs and cresol novolacs; di- and poly-($\beta$-methylglycidyl)-ethers of the abovementioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidylaniline, N,N-diglycidyltoluidine or N,N,N',N'-tetraglycidyl-bis-(p-aminophenyl)-methane; triglycidyl isocyanurate; N,N'-diglycidylethyleneurea; N,N'-diglycidyl-5,5-dimethylhydantoin, N,N'-diglycidyl-5-isopropyl-hydantoin and N,N'-diglycidyl-5,5-dimethyl-6-isopropyl-5,6-dihydro-uracil.

Liquid pre-reacted adducts of such epoxide resins with curing agents for epoxide resins are also suitable.

The synthetic resins of component (a) which contain functional groups can also be reactive constituents of a plastic and be crosslinked with suitable curing agents or modified with suitable comonomers. Monomers, for example polyfunctional isocyanates for the preparation of plastics, and curing agents, are also reactive constituents.

Suitable curing agents for epoxide resins are acid or basic compounds. Examples of suitable curing agents are: amines or amides, such as aliphatic, cycloaliphatic or aromatic primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylene-1,3-diamine, N,N-diethylpropylene-1,3-diamine, 2,2-bis-(4'-aminocyclohexyl)-propane, 3,5,5-trimethyl-3-

(aminomethyl)-cyclohexylamine ("isophoronediamine"), Mannich bases, such as 2,4,6-tris-(dimethylaminomethyl)-phenol; m-phenylenediamine, p-phenylenediamine, bis-(4-aminophenyl)-methane, bis-(4-aminophenyl)-sulfone and m-xylylenediamine; adducts of acrylonitrile or monoepoxides, such as ethylene oxide or propylene oxide, with polyalkylenepolyamines, such as diethylenetriamine or triethylenetetramine; adducts or polyamines, such as diethylenetriamine or triethylenetetramine, in excess, and polyepoxides, such as diomethane polyglycidyl ethers; ketimines, for example of acetone or methyl ketone and bis-(p-aminophenyl)-methane; adducts of monophenols or polyphenols and polyamides; polyamides, especially those obtained from aliphatic polyamines, such as diethylenetriamine or triethylenetetramine, and dimerised or trimerised unsaturated fatty acids, such as dimerised linseed oil fatty acid (VERSAMID); polymeric polysulfides (THIOKOL); dicyandiamide, aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenyl phosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (=methylnadic anhydride), 3,4,5,6,7-hexachloro-3,6-endomethylene-$\Delta^4$-tetrahydrophthalic anhydride, succinic anhydride, adipic anhydride, trimethyladipic anhydride, azelaic anhydride, sebacic anhydride, maleic anhydride or decenylsuccinic anhydride, pyromellitic acid dianhydride or mixtures of such anhydrides.

Examples of suitable curing agents for polyurethanes are liquid, branched polyesters, linear polyesters, polyacetals, polyethers and polythioethers.

Suitable comonomers, for example for unsaturated polyesters or polyimides, are, for example, ethylenically unsaturated compounds such as styrene, acrylic acid esters or methacrylic acid esters.

The mineral filler can be: glass, quartz, clay minerals, feldspars, silicates, carbonates, rock powders, alumina or hydrated aluminas, oxides, carbon, carbides or sulfates, and the materials can be synthetic or naturally occurring materials. Examples are: quartz powder, mica, talc, asbestos, slate flour, kaolin, wallastonite, powdered chalk, dolomite, magnesium carbonate, gypsum, barytes, aluminium oxide, bentones, silicic acid aerogel, lithopones, titanium dioxide, carbon black graphite, metal oxides, glass powders, glass spheres, glass fibres, zinc sulfide, silicon carbide, cristoballite or a mixture of fillers.

The fillers can be in fibre form to granular or pulverulent and can be treated with adhesion promoters which promote binding of the polymer to the particles of the filler. Finely divided fillers are preferred.

According to the invention crystalline synthetic calcium silicate, which can be in diverse stages of hydration and has a high length/width ratio and width dimensions of less than 1 $\mu$m, is used as an additive.

The methods for the preparation of such synthetic calcium silicates are known and are carried out on an industrial scale. In the main, they comprise a hydrothermal reaction in an autoclave, in which predetermined amounts of lime and quartz sand are allowed to react with water under pressure and at elevated temperature. The results are controllable. Examples of materials which are prepared in this way and are suitable for the invention will also be given further below.

The expression "with a high length/width ratio" is intended to indicate that the crystal particles of the additives are of an elongated appearance, i.e. should extend considerably further in one direction than in one of the other two directions.

For example, length/width ratios in the range of 10:1 to 200:1 are suitable.

The predominantly elongated shape of the material of the additive results, relative to the mass of the individual particles, in a relatively large internal surface area, say in the range of from about 5 to 100 $m^2/g$, preferably 30 to 100 $m^2/g$.

The expression "diverse stages of hydration" signifies that the calcium silicates which can be used for the invention differ, inter alia, in respect of their stages of hydration.

The calcium silicates to be used according to the invention can, as a result of their shape, also serve as reinforcing material in plastics batches, as a result of which improved mechanical properties in the plastic mouldings can be achieved.

In a first embodiment, the invention relates to the use of acicular or fibrous crystalline calcium silicate of the type under discussion.

In particular, acicular crystalline xonotlite $Ca_6[(OH)_2/Si_6O_{17}]$ has proved effective. This material has a pronounced acicular structure and under a scanning electron microscope has a felt-like appearance. The length/width ratio of the individual particles is about 100:1 to 50:1. Using the Sedigraph, a residue of 10% is determined with a sedimentation speed equivalent diameter of 1 $\mu$m.

In another embodiment of the invention, a band-shaped crystalline calcium hydrosilicate of the type under discussion is used. In this case, three different linear extensions exist in the three dimensions.

A material which has proved suitable in experiments has, for example, a crystallite particle size distribution in which the maxima are 0.6 $\mu$m in respect of the length, 0.25 $\mu$m in respect of the width and 0.01 $\mu$m in respect of the thickness. In a scanning electron microscope, this material has approximately the appearance of straight or slightly curved strip noodles.

It has been found that the calcium silicates described have a surprisingly good effect as sedimentation inhibitors in flowable mixtures, especially plastics batches.

The particles have a good buoyancy in the flowable material of the suspension and do not easily tend to settle out. The relatively long length results in felting and this likewise counteracts settling out and, moreover, prevents the filler particles present from settling out. The opposite to the morphological form of the calcium hydrosilicates of the invention would be uniformly convex or granular particles.

The use, according to the invention, of the calcium silicates gives rise to a type of thixotropic effect, insofar as sedimentation of the filler particles is quasi counteracted by a high viscosity, i.e. a high resistance to settling out, but, nevertheless, the viscosity which becomes evident on mechanical processing is not substantially increased.

The mixture according to the invention preferably contains a) 20 to 90% by weight and in particular 40 to 90% by weight of the synthetic resin or of the reactive constituent, in particular of an epoxide resin, (b) 80–10% by weight and in particular 60–10% by weight of the filler and (c) 0.5–10% by weight, based on the amount of (a) and (b), of the calcium silicate, which preferably is xonotlite or band-shaped crystalline calcium hydrosilicate with a length/width ratio of 100:1 to 50:1 and a width dimension of less than 1 $\mu$m.

An important prerequisite for the sedimentation-inhibiting effectiveness of the material in a mixture is that the material must be mixed as homogeneously as possible into the other components, which can be effected by intimate mixing of the components in the stirred kettles customarily used for this purpose.

One process embodiment comprises grinding the calcium silicate and the filler together and then adding the ground mixture to the flowable plastic. Grinding the two materials together results in particularly intimate mixing of the components to be added to the flowable plastic.

Since the maximum amount of fillers can be admixed to all the reaction components of a synthetic resin, relatively large amounts of fillers can be incorporated. If large amounts of fillers are used, the flowable mixture can be of a soft, gel-like consistency. Warming or mixing with liquid curing agents is then advisable prior to processing.

The flowable mixtures according to the invention are used in the main as casting, spreading and impregnating resins. They are filled systems which are stable on storage and in which the sedimentation of fillers has been substantially suppressed, which has great advantages from the point of view of application technology since fillers which have settled out are frequently so hard and difficult to remove that they can no longer be processed. If settling does take place, the mixture can easily be homogenised again.

The examples which follow illustrate the invention in more detail.

EXAMPLE 1

Sedimentation-free, filled epoxide resin with a filler content of 54.3% by weight.

100 parts by weight of liquid epoxide resin based on bisphenol A, 60 parts by weight of quartz powder, 60 parts by weight of extremely fine quartz powder and 1.5 parts by weight of xonotlite are mixed intimately with one another using a stirrer.

The mixture is then stored for 180 days at a room temperature, during which time it becomes gel-like. No sedimentation is observed. After mixing with an anhydride curing agent, the mixture is poured into moulds and cured to give mouldings.

EXAMPLE 2

Sedimentation-free, filled anhydride curing agent with a filler content of 51.7% by weight.

140 parts by weight of phthalic anhydride, 100 parts by weight of quartz powder, 50 parts by weight of extremely fine quartz powder and 2 parts by weight of xonotlite are intimately mixed using a stirrer.

The viscous mixture is then stored for 180 days at room temperature. No sedimentation is observed during this period.

EXAMPLE 3

Sedimentation-free, filled epoxide resin containing 31% by weight of filler.

100 parts by weight of liquid epoxide resin based on bisphenol A, 45 parts by weight of quartz powder, 3.6 parts by weight of flexibiliser, 1 part by weight of colour paste and 1.5 parts by weight of xonotlite are intimately mixed using a stirrer. No sedimentation is observed after storing the flowable mixture for 180 days at room temperature.

EXAMPLE 4

Sedimentation-free anhydride curing agent with a filler content of 13% by weight.

100 parts by weight of phthalic anhydride, 15 parts by weight of aluminium oxide and 3 parts by weight of xonotlite are intimately mixed using a stirrer. After storing for 100 days at room temperature, the flowable mixture is virtually free from sedimentation residues.

EXAMPLE 5

To assess the influence of the sedimentation characteristics of a suspension containing 50% by weight of filler (calcite) in liquid epoxide resin based on bisphenol A, tests were carried out on samples without further additive and on samples containing increasing proportions of band-shaped crystalline calcium hydrosilicate which had a crystallite particle size distribution in which the maxima, detrmined from the scanning electron microscope photograph, were about 0.6 $\mu$m in respect of the length, 0.25 $\mu$m in respect of the width and 0.01 $\mu$m in respect of the thickness. The viscosity of the system was determined using a Brookfield rotary viscometer.

The following values were determined.

| | |
|---|---|
| Blank test | $2 \times 10^4$ cP |
| 2% of calcium hydrosilicate | $3 \times 10^4$ cP |
| 3% of calcium hydrosilicate | $4 \times 10^4$ cP |
| 5% of calcium hydrosilicate | $7 \times 10^4$ cP |

The percentages given are based on the total amount.

The samples were stored for 12 months. After this period, the blank test samples had cemented so as to be virtually insoluble. In the case of samples which contained the band-shaped calcium silicate as an additive, it was possible to stir up the sediment again without any considerable mechanical action, to give a homogeneous suspension.

EXAMPLE 6

Quartz powders and cristobalite powders were mixed into epoxide resin, in some cases without the addition of xonotlite, and in other cases with the addition of xonotlite, and the tendency of the suspension to sediment was investigated. The test programme comprised the range:
62–20% by weight of filler (quartz powder or cristobalite powder)
38–80% by weight of epoxide resin The samples containing xonotlite contained the latter in various proportions up to a maximum of 5% by weight of the total amount.

After storing for four months, the filler in the samples without xonotlite had all settled out on the base, where it had formed a solid mass which could be stirred up only with great effort and which it was already no longer possible to disperse uniformly in the epoxide resin.

In the case of the samples containing xonotlite, the sediment formed could be stirred up again, without any substantial mechanical action, to give a homogeneous suspension.

What is claimed is:

1. A flowable, liquid mixture which contains, based on the total mixture,
   (a) 90 to 40% by weight of a liquid selected from the group consisting of a liquid synthetic self-crosslinkable resin, and an organic liquid curing agent,
   (b) 9.5 to 59.5% by weight of a mineral filler, and
   (c) 0.5 to 10% by weight of a crystalline synthetic calcium silicate, which can be in diverse stages of hydration and has a high length/width ratio and a width dimension of less than 1 μm.

2. A mixture according to claim 1, wherein the calcium silicate is acicular, fibrous or band-shaped.

3. A mixture according to claim 1, wherein the maxima of the crystallite size are 0.6 μm in respect of the length, 0.25 μm in respect of the width and 0.01 μm in respect of the thickness.

4. A mixture according to claim 1, wherein the calcium silicate is xonotlite of the formula $Ca_6[(OH)_2/Si_6O_{17}]$.

5. A mixture according to claim 1, which contains as the liquid an unsaturated polyester resin, a polyurethane resin or a pre-reacted epoxide resin as the synthetic resin, or a polyepoxide compound or a hardener for said compound.

6. A mixture according to claim 1, wherein contains acicular crystalline xonotlite $(Ca_6[(OH)_2/Si_6O_{17}])$ or band-shaped crystalline calcium silicate with a length/width ratio of 100:1 to 50:1 and width dimensions of less than 1 μm.

7. A mixture according to claim 1, wherein the liquid is a liquid epoxy resin.

8. A mixture according to claim 1, wherein the mineral filler is quartz powder, mica, talc, asbestos, slate flour, kaolin, wollastonite, powdered chalk, dolomite, magnesium carbonate, gypsum, barytes, aluminum oxide, bentones, silicic acid aerogel, lithopones, titanium dioxide, carbon black, graphite, metal oxides, glass powders, glass spheres, glass fibers, zinc sulfide, silicon carbide, cristoballite or a mixture of fillers.

9. A process for the preparation of a flowable, liquid mixture according to claim 1 which comprises
   adding components (a), (b) and (c) to a stirred vessel, and
   stirring the resulting mixture to disperse the calcium silicate, component (c), homogeneously therein and to convert the mixture to a flowable, liquid mixture.

* * * * *

UNITED STATES PATENT AND TRADEMARK OFFICE
CERTIFICATE OF CORRECTION

PATENT NO. : 4,490,492

DATED : December 25, 1984

INVENTOR(S) : Dieter Skudelny and Gerhard Rauth

It is certified that error appears in the above-identified patent and that said Letters Patent is hereby corrected as shown below:

Claim 6, Column 8, Line 4 should read--

A mixture according to claim 1, which contains --.

Signed and Sealed this

Twenty-second Day of October 1985

[SEAL]

Attest:

DONALD J. QUIGG

Attesting Officer

Commissioner of Patents and
Trademarks—Designate